Oct. 28, 1941.  G. A. D'ARCY ET AL  2,260,987
HUMIDIFYING HEAD
Filed June 22, 1939  2 Sheets—Sheet 1
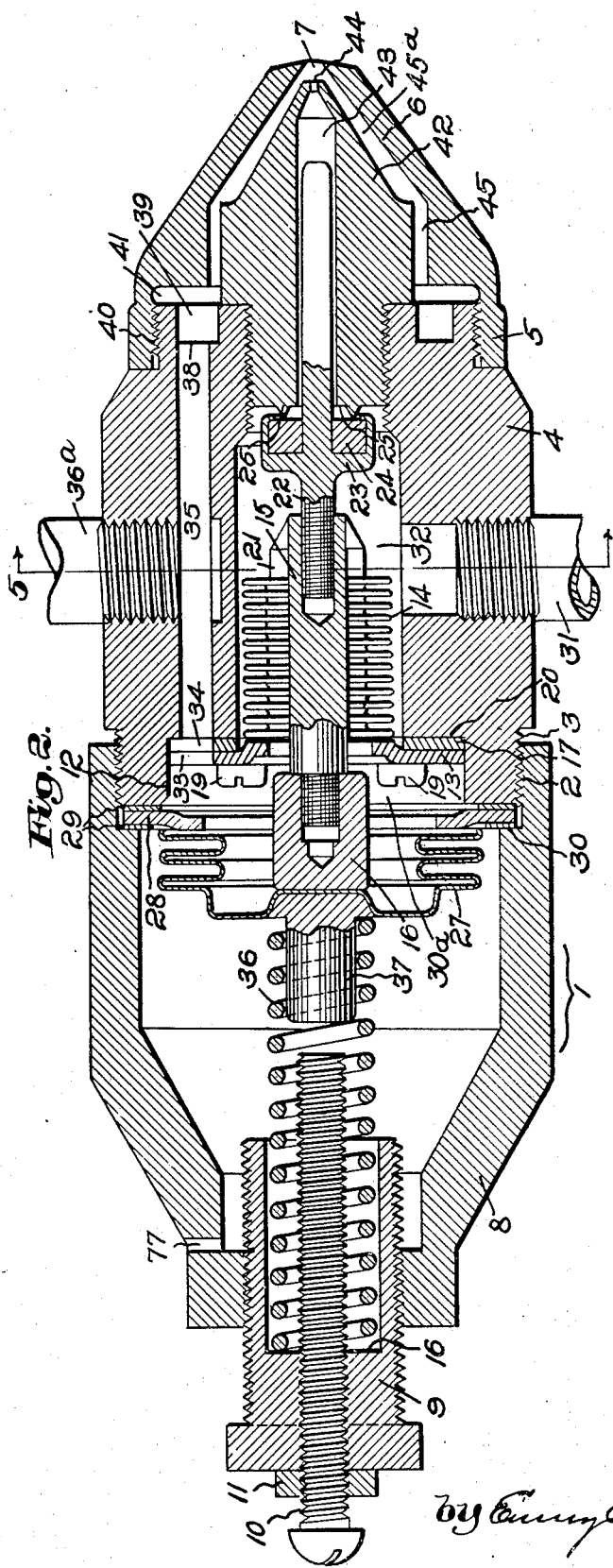
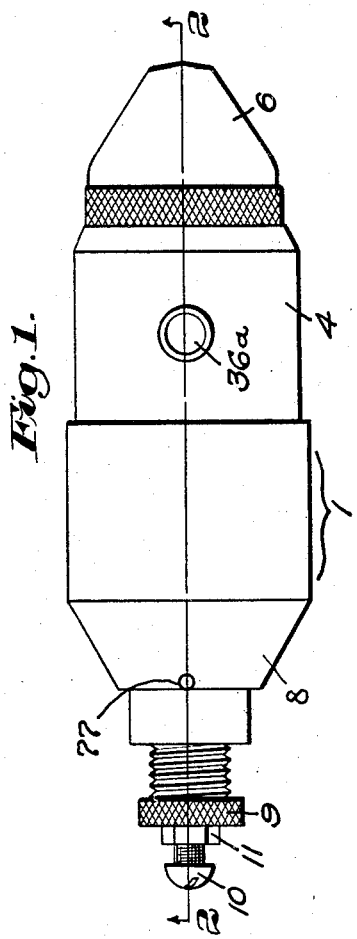
Inventors:
George A. D'Arcy,
James R. Rabbitt, Oct. 28, 1941.  G. A. D'ARCY ET AL  2,260,987
HUMIDIFYING HEAD
Filed June 22, 1939  2 Sheets-Sheet 2
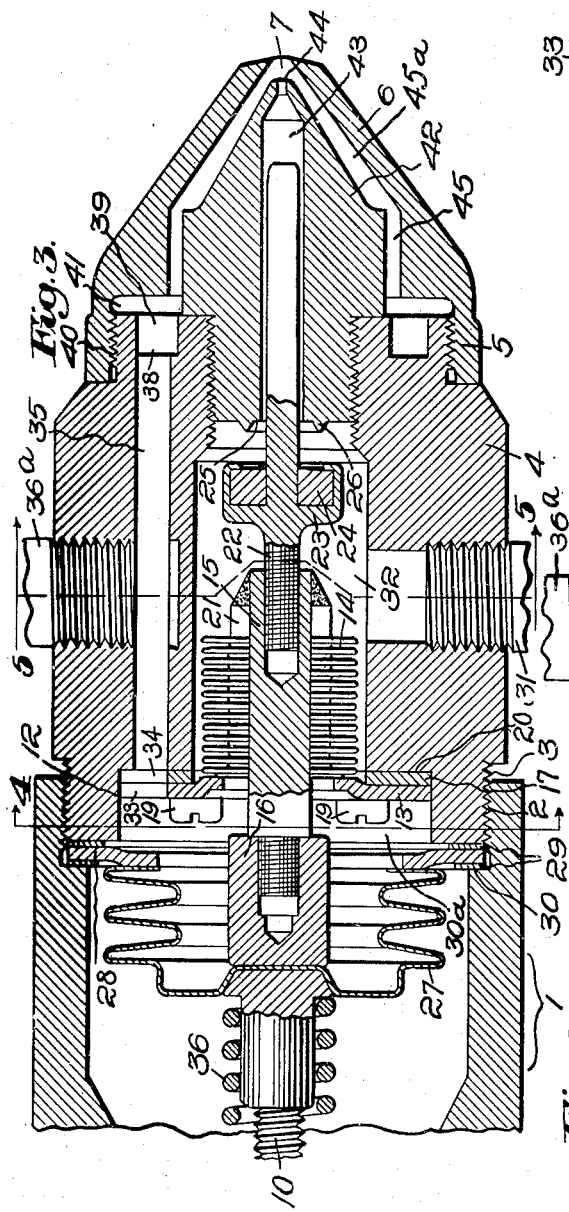
Inventors
George A. D'Arcy,
James R. Rabbitt, Patented Oct. 28, 1941

2,260,987

UNITED STATES PATENT OFFICE 2,260,987

HUMIDIFYING HEAD

George A. D'Arcy, Newton, and James R. Rabbitt, South Hanover, Mass., assignors to Rhode Island Humidifier & Ventilating Co., Boston, Mass., a copartnership composed of George W. D'Arcy and George A. D'Arcy Application June 22, 1939, Serial No. 280,554

5 Claims. (Cl. 299—140)

This invention relates to humidifying apparatus generally, but is particularly intended for use in textile mills and the like, and in a system including a humidistat or its equivalent, for humidifying and controlling the humidity of the air by vaporization of a liquid, as water or its equivalent, under pressure, through the agency of air used under less pressure; and its aim is to provide an improved and novel vaporizing head therefor that will be much more economical to operate and more efficient than those now in use, so far as we are aware.

This invention is particularly directed to the type of apparatus that is adapted for use for vaporizing water or other liquid under pressure, through the agency of air or a gas.

In the drawings of the illustrative embodiment of our invention described herein:

Fig. 1 is a plan of the humidifying head;

Fig. 2, a vertical, longitudinal section, on an enlarged scale, on the line 2—2, Fig. 1, showing the liquid control valve closed;

Fig. 3, a similar view, showing the liquid control valve open;

Fig. 4, a cross-sectional view on the line 4—4, Fig. 3, looking toward the right;

Fig. 5, a similar view on the line 5—5, Fig. 3, looking in the same direction;

Fig. 6, a partial vertical, sectional view of a modified form of nozzle.

The head, as shown herein, Figs. 1, 3, comprises a multi-part, herein three-part elliptical or cartridge-shaped, structure with a body section 1 of suitable size, threaded at 2 to receive the cooperating threaded end 3 of a similarly-shaped control or valve section 4, which section is, in turn, threaded on its opposite end to receive the threaded end 5 of the nozzle 6 with a discharge vent 7. A vent 77 equalizes the air pressure within section 1.

The part 1 is provided at its, Fig. 2, left-hand end with a shouldered, conical end 8 of reduced diameter, carrying a spring barrel 9, into the end of which, in turn, is threaded a valve action adjustable screw 10 with a locknut 11, operative to limit the travel of the valve operating means, that is the bellows, of the water valve, to be described, to the desired extent relative to the air or other pressure agency to be used.

The control or valve section 4 is counterbored at 12, to receive the bellows disk-like supporting member 13 on one end of a bellows 14, in turn carried by a liquid valve stem 15. A gasket 17 is provided at the inner side of the disk 13, which is secured as by screws 19 to the countersunk wall 20 in the part 4. The bellows 14 is primarily a valve-closing member, and cooperates with other elements, as hereafter described.

The stem 15 moves freely through an opening in the disk 13, and carries at its right-hand end a hub or bellows-core 21, in which is mounted, as by threading therein, one end of the valve spindle 22, and which carries a head 23 with a cushion of suitable material, as rubber or soft metal, 24, which seats, when the valve is closed as in Fig. 2, in the seat 25 with a bead-like flange 26 in the nozzle member so that the liquid, even when under substantial pressure, will not escape, to be described. The stem 15 carries at its opposite end also a second valve-opening diaphragm or bellows, herein the latter, 27, bellows and valve supporting ring 28 and gaskets 29, which ring, in turn, is seated on the countersunk end wall 30 on the member 1, and retained therein by the end of the section 4 when in place, and the bellows is thus positioned opposite to the bellows 14, with which it cooperates to form a common air chamber 30a. On its left-hand face, or head, the valve opening diaphragm bellows 27 carries a post 16, which, in turn, receives the end of the stem 15. A water connection 31 from any source of supply leads to a water chamber 32, in section 4. When the valve 22 is closed, the bellows 14 is in its normal inflated condition, and the bellows 27 in its normal non-inflated condition, Fig. 2, or it may be slightly compressed, according to the tension of the spring 36. Thus the closing of the water valve 22 is not entirely dependent on the action of the bellows 27, but the bellows 27 and 14 cooperate normally, as the bellows 27 returns to its normal uninflated condition when the bellows 14 moves to its normally expanded condition. Thus there is no danger of the valve 22 leaking, as the two bellows closely cooperate to prevent it. The pressure of spring 36 tends to seat the liquid valve firmly, offsetting any excess of pressure on the bellows as compared to that on the valve 23.

While, heretofore, in the installation of humidifying apparatus, the advantages of a system using water under pressure, rather than water with only a gravity feed, have been substantial, such as flexibility in varying the volume of water to be vaporized, the use of smaller pipes for the water supply, smaller valves, with consequent less labor cost, yet the air requirement in such cases, whether or not the water was under substantial or practically no pressure, entailed a comparatively very high cost for operation of either type of humidifying system, as compared with those types wherein little or no air pressure was used, because of the electric power cost for the operating air.

This was to some extent, and proportioned to the cost of the power for the operating air, a deterrent to the installation of the air pressure type system, and one important advantage of our novel head is that it will operate to vaporize the usual same amount of water heretofore used under the same circumstances, with the use of a much less volume of air at the usual or same pressure with a consequent very substantial saving in the cost of operation and installation for compressor equipment, motor and piping.

Accordingly, we have provided the present humidifying head of novel type to that end. Instead of feeding the water to the head by the atomizer or suction principle, we use the pressure principle, and to that end the disk 13 is provided with an air port 33, registering with the air port 34 of the duct 35, which is supplied with air by a connection 36a from any suitable supply not shown. Air admitted through this port 34 and the opening 33 in the disk 13 enters the bellows 27, of metal or other suitable material, and inflates the bellows against the action of the spring 36 on the post 37, withdrawing the valve head 23 from its seat 25, and compressing or closing the bellows 14, and permitting water to pass through the seat 25. At the same time, air passes by the port 38 to the circular passage 39 at the end of the section 4.

When air is shut off in the duct 35, the spring 36 closes the bellows 27 to normal size, and with the aid of the bellows 14, which expands to its normal size, Fig. 1, and some aid by the water pressure in the chamber 32, seats the valve stem 23.

The nozzle 6 is counterbored adjacent its threaded end 40 to provide a circular ring-like chamber and passage 41 for the passage of air therethrough to the nozzle vent 7.

Within the nozzle 6 is a smaller but similar nozzle 42, with a passage 43 and vent 44, this nozzle spaced from the nozzle 6 and forming between them an atomizing chamber 45, connected with the ring-like chamber 41, countersunk chamber 39 and cone-shaped chamber 45a, in which the water is most thoroughly atomized or broken up before it escapes through the vent 7. This occurs because the air under pressure, on entering the ring-like passage 32 which is circular, acquires a circular or swirling motion, which it retains as it passes through chambers 45 and 45a, drawing into them some of the water from the nozzle 44.

The head is thus equipped for effecting internal vaporization, which is much more economical in the use of air for any given amount of water, and vaporizes the liquid very thoroughly. The water under a given pressure passes through the water duct 43, and in emerging from the orifice 44 is given added velocity by reason of having been passed through the restricted orifice 44. At the same time, the cross-section of the water stream has been greatly diminished, and this fact, with the added velocity of the water acquired by its passing through the orifice 44, makes it easier for the air to vaporize the water. At the same time, the air passing through the tapering chamber 45a takes on increased velocity which, in turn, helps to make more efficient vaporization by projecting the vapor for from ten to twenty feet from the nozzle.

In Fig. 6, there is shown a modified form of the vaporizing elements, and wherein the inner or water-supplying nozzle 42 is provided at its outlet orifice 44 with an over-hanging water globule-breaker 46, in the form of a small longitudinal pin inwardly and axially directed, which assists in atomizing the water before it mixes with the air.

Experience so far has indicated that the amount of air used with the head herein disclosed is practically 40% less than the amount used heretofore in humidifying systems using either water under pressure or water with gravity feed.

We attribute a substantial portion of this saving to the novel design of nozzle, providing what may be termed internal vaporization of the liquid in the nozzle, as compared to the suction type of nozzle, where the water is sucked through the nozzle by the air under pressure at the nozzle vent, and then vaporized without or beyond the end of the nozzle with a substantial loss of air; substantial economy is achieved also by the economical and efficient valve controlled mechanism.

Our invention is not limited to the precise construction shown herein, but may be modified in many details, without departing from the spirit of the claims, and within the scope thereof.

We claim:

1. A humidifying head for use in a humidifying system with air under pressure and liquid under greater pressure, the head having a liquid chamber, a liquid inlet thereto, a valve with a stem in the chamber and a liquid nozzle connected with the chamber, an air duct in the head with an air inlet thereto and an air nozzle on the head connected with said duct and spaced from the liquid nozzle and providing therewith an internal atomizing chamber connected with the liquid chamber by said valve; and means, including said stem on the liquid valve, a normally expanded valve-closing bellows on the stem, a normally contracted valve-opening bellows on the stem and a valve and bellows action regulating spring on the stem, and an air port from said air duct to said valve-opening bellows to expand the contracted bellows and contract the expanded bellows when air is admitted, to open the liquid valve to said atomizing chamber, said means acting to reverse the normal direction of operation of both said bellows, and effect of said spring on the valve stem to close the valve when the air pressure is reduced.

2. A humidifying head comprising a body section, with a valve action regulating member therein; a valve section removably attached to the body section and with an air port and an air duct therein and to the body section; a liquid chamber in the valve section with a liquid inlet thereto and a valve therein; a valve-opening bellows on said valve stem in the body section connected with said air duct; a valve-closing bellows also on said stem in the valve section and connected with the air duct and having, with the valve-opening bellows, a common air chamber between them; a nozzle on the valve section connected with said air duct, and a second nozzle within and spaced from the first nozzle and connected with said liquid chamber, and forming, with the first nozzle, an atomizing chamber with a plurality of relatively angular walls, acting to break up the liquid globules therein.

3. A humidifying head adapted to be connected to air and liquid supply sources, the head comprising a body section with an adjustable valve-action-regulating member therein, a valve Section detachable from the body section and with an air duct therethrough and an air inlet therefor; a liquid chamber with a liquid inlet thereto in the valve section, and a liquid valve with a stem in said section; a normally contracted expansible-wall valve-opening member mounted in said body section and on the valve stem with said valve-action-regulating member thereon, said valve-opening member connected with the air duct and actuated therefrom; a normally expanded expansible-wall valve-closing member for the valve stem in the valve section; and an air nozzle detachable from the valve section and connected with said air duct, and a liquid nozzle on said section and connected with the liquid chamber, forming between the nozzles a cone-shaped passage, an elongated sleeve-like passage, a ring-like, air-swirling passage, and, connecting with a countersunk circular passage in the valve section, providing a multi-angle atomizing chamber, the said inner nozzle discharging within said outer nozzle and providing internal atomization.

4. A humidifying head comprising a body section, and a valve section on one end thereof having a countersunk circular air passage in the opposite end of the valve section and having an inner liquid nozzle thereon with a passage therethrough, an outer air nozzle on said section end and enclosing and spaced from and forming, with the inner nozzle, an atomizing chamber of varying longitudinal configuration; said valve section having an air port leading to a source of air under pressure, and a duct in said section leading from said air port to said countersunk circular air passage and to said atomizing chamber; a liquid chamber in the valve section having a liquid port leading therefrom to a source of liquid, and a valve connecting said chamber with the atomizing chamber; a common air chamber between and in said valve and body section ends connected to the air duct, and a normally expanded liquid-valve-closing bellows and a valve-closing spring on the liquid valve stem acting to close said valve when the air pressure is reduced, and a normally contracted liquid-valve-opening bellows on the said valve stem, both bellows opening into said air chamber with juxtapositioned mouths, the normally contracted valve-opening bellows acting, when expanded by the air pressure, to open the liquid valve; said valve-opening bellows expansible cooperatively and simultaneously with and in the opposite direction from the valve-closing bellows; said air port and air duct acting to admit air under pressure to effect expansion of said valve-opening bellows to open the liquid valve and the duct leading also to the atomizing chamber acting to admit air between the nozzles to provide an agitated body of air being in longitudinal section successively of rectangular, vertically elongated, horizontally elongated, and finally cone-shaped, effecting intense internal vaporization by the use of both air and water under pressure.

5. A humidifying head comprising a body section, a valve section thereon with a liquid chamber therein, an inner nozzle on the valve section outer end with a liquid passage therethrough from said liquid chamber, and a valve seat on said nozzle inner end for the liquid passage, a water port in said liquid chamber leading to a source of water supply; an outer nozzle on said valve section outer end and about the inner nozzle and spaced therefrom, and a curvilinear recessed air passage in an upright plane in the nozzle end of the valve section and opening into the space between said nozzles, said latter space providing a narrow and deep ring-like chamber, and, connected thereto, a relatively wide, shallow, sleeve-like chamber, and connected thereto a cone-like chamber varying in width, said chambers progressively, relatively positioned between the nozzles but successively of less width and creating, in combination, when the head is in operation a swirling, velocity-building body of air, and, at the inner nozzle tip, effecting forceful atomization of the liquid; an air port in the valve section and a duct leading therefrom through the valve section to the said curvilinear passage in the valve section end, and also leading to the opposite end of the valve section to admit air to operate said head; a liquid valve in said liquid chamber on said seat therefor on the water nozzle inner end, a normally expanded liquid valve-closing bellows on one end of the liquid valve stem in said valve section; and a larger normally contracted liquid-valve-opening bellows on the opposite end of said valve stem in said body section, a common air chamber in and between said body and valve sections connected with the said air duct and for both valve-operating bellows, both said valve bellows operating cooperatively through said common air duct and chamber; and a spring on the liquid valve stem normally acting to limit the action of the valve-opening bellows and to assist the action of the valve-closing bellows, and means in the body section and on said valve-opening bellows for adjusting the tension of said spring in accordance with the air and water pressure used.

GEORGE A. D'ARCY.
JAMES R. RABBITT.

CERTIFICATE OF CORRECTION.

Patent No. 2,260,987. October 28, 1941.

GEORGE A. D'ARCY, ET AL.

It is hereby certified that error appears in the printed specification of the above numbered patent requiring correction as follows: Page 2, second column, line 11, after the word "systems" insert --vaporizing the same amount of water,--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.